(12) United States Patent
Medin et al.

(10) Patent No.: US 9,497,142 B2
(45) Date of Patent: Nov. 15, 2016

(54) TRIGGERING ACTIONS ON A COMPUTING DEVICE

(71) Applicant: T-Mobile USA, Inc., Bellevue, WA (US)

(72) Inventors: Craig Medin, Mercer Island, WA (US); Timothy Shelton, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 65 days.

(21) Appl. No.: 13/775,937

(22) Filed: Feb. 25, 2013

(65) Prior Publication Data

US 2014/0156992 A1 Jun. 5, 2014

Related U.S. Application Data

(60) Provisional application No. 61/732,151, filed on Nov. 30, 2012.

(51) Int. Cl.
*H04L 29/06* (2006.01)
*H04L 12/58* (2006.01)

(52) U.S. Cl.
CPC ............ *H04L 51/04* (2013.01); *H04L 63/123* (2013.01)

(58) Field of Classification Search
CPC ........................... H04L 51/04; H04L 12/5835
USPC .......................................... 713/168; 455/466
See application file for complete search history.

(56) References Cited

U.S. PATENT DOCUMENTS

| 5,623,601 | A | * | 4/1997 | Vu ........................ H04L 29/06 726/12 |
| 5,758,087 | A | * | 5/1998 | Aaker et al. .................. 709/232 |
| 6,085,325 | A | * | 7/2000 | Jackson et al. ............... 713/300 |
| 7,076,657 | B2 | | 7/2006 | Koukoulidis et al. |
| 7,634,280 | B2 | | 12/2009 | Modeo |
| 7,675,867 | B1 | * | 3/2010 | Mraz et al. .................... 370/254 |
| 2006/0007901 | A1 | * | 1/2006 | Roskowski et al. .......... 370/338 |
| 2007/0118709 | A1 | * | 5/2007 | Tysowski et al. ............. 711/165 |
| 2009/0054117 | A1 | * | 2/2009 | Beser et al. ....................... 463/1 |
| 2009/0069038 | A1 | * | 3/2009 | Olague et al. ................ 455/466 |
| 2009/0305673 | A1 | | 12/2009 | Mardikar |
| 2010/0029302 | A1 | * | 2/2010 | Lee et al. .................... 455/456.6 |
| 2010/0131763 | A1 | * | 5/2010 | Kim ..................... H04L 9/0825 713/171 |

(Continued)

FOREIGN PATENT DOCUMENTS

| WO | WO2011030352 | 3/2011 |
| WO | WO2012131659 | 3/2011 |

OTHER PUBLICATIONS

Shahriar, "Detection of Repackaged Android Malware", 2014, IEEE, p. 349-354.*

(Continued)

*Primary Examiner* — Taghi Arani
*Assistant Examiner* — Gregory Lane
(74) *Attorney, Agent, or Firm* — Lee & Hayes, PLLC

(57) ABSTRACT

In some implementations, a computing device may download a campaign from a server. The campaign may include a trigger and one or more actions associated with the trigger. In response to detecting that the trigger occurred, the computing device may perform the one or more actions associated with the trigger. The trigger may comprise an event that occurs at the computing device or a short message service (SMS) message that originates from the server.

13 Claims, 6 Drawing Sheets

(56) References Cited

U.S. PATENT DOCUMENTS

| | | |
|---|---|---|
| 2010/0248700 A1* | 9/2010 | Endou .................. 455/414.1 |
| 2010/0273450 A1* | 10/2010 | Papineau et al. ............ 455/411 |
| 2011/0119478 A1* | 5/2011 | Jackson .................. 713/100 |
| 2011/0145564 A1 | 6/2011 | Moshir et al. |
| 2011/0307706 A1 | 12/2011 | Fielder |
| 2011/0314426 A1* | 12/2011 | Jakobsson et al. .......... 715/863 |
| 2012/0039941 A1* | 2/2012 | Barbieri .................. C12N 9/52 424/239.1 |
| 2012/0177199 A1 | 7/2012 | Baek et al. |

OTHER PUBLICATIONS

Almohri, "Process Authentication for High Assurance", Mar. 2014, IEEE, p. 168-180.*

* cited by examiner

TRIGGERING ACTIONS ON A COMPUTING DEVICE

RELATED APPLICATIONS

This application claims priority to U.S. provisional patent application No. 61/732,151, entitled "Post-Call Messaging and Secure Texting" and filed on Nov. 30, 2012. Application No. 61/732,151 is fully incorporated herein by this reference.

BACKGROUND

As computing devices, such as cell phones and tablets, become more complex, network service providers may desire to provide different types of information to users. For example, when users call a network support center to report a problem with the network (e.g., by dialing "611" in North America), a network service provider may desire to inform the users that an application is available for download to help the users troubleshoot problems. Similarly, the network service provider may desire to provide other types of information to users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
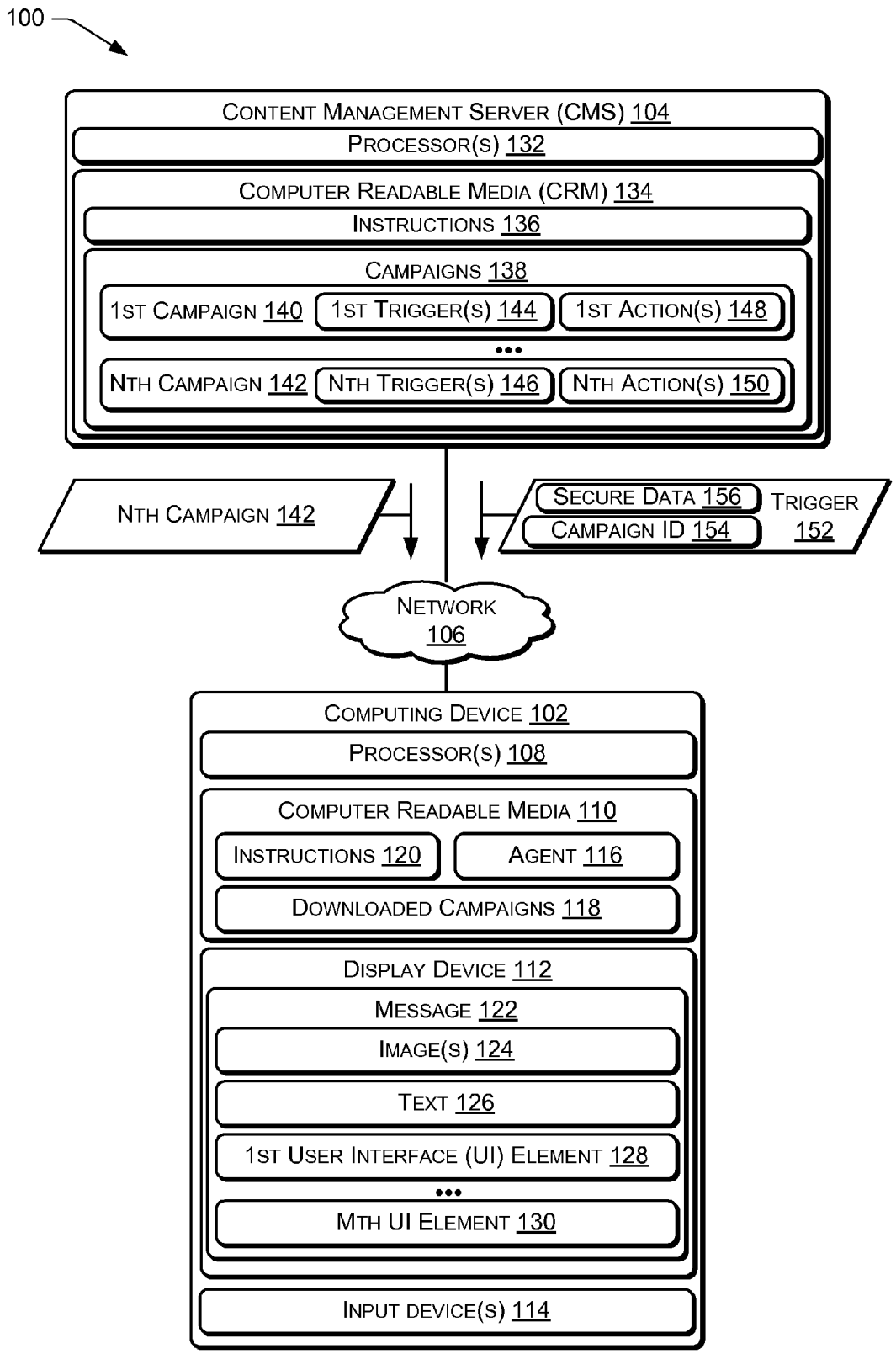
FIG. 1 is a block diagram illustrating a system for triggering actions on a computing device according to some implementations.

The system and techniques described herein enable a network service provider to trigger actions on computing devices of subscribers. For example, the subscribers may use computing devices to engage in various types of communications, including making phone calls or sending short message service (SMS) messages. The network service provider may infer behavioral information associated with the subscribers based on how they are communicating and with whom they are communicating. The systems and techniques described herein may enable a network service provider to provide a subscriber a predetermined experience after the subscriber has completed a specific communication, at no cost to the subscriber and with no connectivity requirements (e.g., without using any of the subscriber's usage plan), allowing for a very targeted and timely experience. While examples described herein may include a mobile network and mobile computing devices, the system and techniques described herein may be applied to all types of networks, including wired networks, wireless networks, or any combination of wired networks and wireless networks.

The network service provider may provision an agent on computing devices that are used by subscribers. The agent may be a software application that automatically starts each time a computing device is powered on (e.g., booted up) and may not be removable by subscribers. For example, the agent may be installed in a protected portion of memory and may be not be deleted, modified, or replaced by a subscriber. The agent may be deleted, modified, or replaced using a special password known to authorized service personnel and to a server, such as a content management server (CMS).

The agent may periodically (e.g., daily) connect to the server. The server may be used to distribute firmware and/or software upgrades to the computing devices of subscribers. The server may also be used to distribute campaigns to multiple computing devices. A campaign is one or more actions that the agent may perform in response to detecting a triggering event. A campaign may have an associated expiry date or predetermined time period during which the campaign is active. After the expiry date or the predetermined period of time has elapsed, the campaign may no longer be valid.

A campaign may be triggered in response to each agent on multiple computing devices detecting a trigger, e.g., an occurrence of an event, such as an action performed by a user, a condition associated with the computing device, receiving a trigger message from the server, or the like. The computing devices may be capable of authenticating the trigger message as originating from a trusted party, such as the server, to prevent unauthorized parties from triggering campaigns using fake trigger messages.

Computing devices may connect to the server and download a campaign that includes one or more triggers and actions corresponding to each trigger. The corresponding actions may be performed when the agent of a computing device detects the occurrence of a trigger associated with a campaign. For example, one of the triggers may include a set of digits. After a call is completed (or an SMS message has been sent), the agent may compare the digits of the called party (or the SMS message destination) with the one or more sets of digits of the campaign. If the digits of the called party (or the SMS message destination) match a set of digits of the campaign, the agent may automatically (e.g., without human interaction) perform the corresponding actions of the campaign. For example, the agent may display a message based on the digits used in a recent communication (e.g., call or SMS message). To illustrate, when a subscriber calls "611" to report a perceived problem with the service provider, after the call has completed, the agent may display a message indicating that a software application ("app") is available to assist in troubleshooting service-related problems. The message may also include action buttons, such as a button that, when selected, opens a web browser to a specific location to enable the subscriber to learn more about the app or a button that, when selected, causes the app to be downloaded and installed. Thus, a campaign may be triggered based on something that occurred on the computing device.

A campaign may be triggered in response to one or more computing devices receiving a trigger message (e.g., an SMS message) from the server. SMS messages by themselves are not inherently secure and may be easily spoofed. Spoofing refers to a sender of an SMS message causing the SMS message to appear as if the SMS message was sent by a different sender. For example, an unauthorized party may send an SMS message that appears to have originated from the server rather than from another party. The system and techniques described herein enable computing devices to authenticate an SMS message, thereby enabling secure SMS messages between the server and the computing devices.

The server and each computing device that connects to the server may be provided with a key, such as a shared secret key. For example, the key may be stored in a hidden area of memory of the computing device that is accessible only to the agent. In some cases, the key may be unique for each computing device while in other cases the same key may be used for more than one computing device. The server may have copies of the keys that have been provided to the computing devices. A user, such as an administrator, may create a campaign that includes actions to be performed after the campaign is triggered. The user may store the campaign on the server. The server may create a secure data element (e.g., a cryptographic hash code or a message digest) based on a content of the campaign (e.g., the actions) using the key associated with the server. The secure data element may be associated with the campaign while being separate and distinct from the campaign. When a computing device connects to the server, the server may instruct the agent to download the campaign. To trigger the campaign, the server may send an SMS trigger message to one or more computing devices. The SMS trigger message may include a campaign identifier and the secure data element. In response to receiving the SMS trigger message, the agent may create a local secure data element based on a content of the downloaded campaign using a local key (e.g., the key stored in the computing device). The agent may authenticate the trigger as being sent from the server by comparing the local secure data element with the secure data element received in the trigger. If the local secure data element matches (e.g., is identical to) the secure data element received in the trigger, the agent may determine that the trigger is authentic and perform the actions specified in the campaign. For example, the actions may include displaying a message that includes action buttons to perform various actions. Thus, the server may be used to distribute a campaign to multiple computing devices and to trigger the campaign by sending an SMS trigger message. Computing devices that receive the SMS trigger message may determine whether the SMS trigger message originated from the server, preventing campaigns from being triggered by SMS messages from unauthorized senders.

Thus, a server may be used to distribute campaigns to multiple computing devices. The campaigns may be triggered in response to a trigger event. The trigger event may include events that occur at the computing device and SMS messages received from the server. The campaigns may be distributed to at least a portion of the computing devices that are capable of connecting a service provider's network. For example, the server may provide the campaign for download only to computing devices that match certain criteria, such as a geographic location, an area code, a zip code, a number of calls originating from the computing device in a predetermined time period, a number of texts originating from the computing device in a predetermined time period. a profile associate with a subscriber, a type of operating system used by the computing device, a type of computing device, etc.

FIG. 1 is a block diagram illustrating a system 100 for triggering actions on a computing device according to some implementations. The system 100 includes a computing device 102 communicatively coupled to a content management server (CMS) 104 via a network 106. The network 106 may include one or more wireless networks and/or wired networks. The wireless networks may use various protocols, such as one or more of global system for mobile (GSM), code division multiple access (CDMA), long term evolution (LTE), general packet radio system (GPRS), enhanced data rates for GSM evolution (EDGE), 802.11, Bluetooth, and the like. The wired networks may use various protocols, such as one or more of data over cable service interface specification (DOCSIS), digital subscriber line (DSL), Ethernet, or similar protocols.

The computing device 102 may include one or more processors 108, one or more computer readable media 110, a display device 112, and one or more input devices 114. For example, the computing device 102 may be a wireless phone, a tablet computing device, a media playback device, a still and/or video camera, or any combination thereof. The one or more computer readable media 110 may include various types of memory and/or storage, such as one or more of read-only memory (ROM), random access memory (RAM), solid state drives (SSD), disk-based storage, etc. The display device 112 may include various technologies, such as light emitting diodes (LED), liquid crystal display (LCD), plasma, electrophoretic displays (EPD), or any combination thereof. The one or more input devices 114 may include one or more of a keypad, a numeric pad, a mouse or trackball, a touch screen, another type of input device, etc.

The computer readable media 110 may be used to store instructions 120 that are executable by the processors 108 to perform various actions, including interacting with a user (e.g., a subscriber). The computer readable media 110 may include an agent 116. The agent 116 may be stored on the computing device 102 when the computing device 102 is provisioned. The agent 116 may be stored in the computer readable media 110 in such a way that subscribers may be unable to delete or modify the agent 116. In some cases, the agent 116 may be updated or modified by authorized personnel (e.g., by entering an access code) or by the server 104. The agent 116 may startup each time the computing device 102 is powered on (e.g., booted up). The computer readable media 110 may be used to store downloaded campaigns 118 that the agent 116 downloads from the server 104.

In response to detecting a triggering event, the agent 116 may automatically perform one or more actions, such as displaying a message 122 on the display device 112. Of course, the agent 116 may perform other actions in addition to or instead of displaying the message 122, such as opening a browser and navigating to a particular universal resource locator (URL), opening a software application, closing a software application, providing input to a software application, or the like. The message 122 may include one or more images 124, text 126 (e.g., one or more of header text, body text, or footer text), and M user interface (UI) elements, such as a first UI element 128 to an Mth UI element 130 (where M>0). Selecting one of the UI elements 128 to 130 may cause one or more actions, such as opening a predetermined URL in a browser, performing a device specific action (e.g., opening a software application, closing a software application, providing input to a software application, or the like), setting a reminder for a later time based on a time interval selected by the user, etc.

The CMS 104 may include one or processors 132 and one or more computer readable media 134. The computer readable media 134 may include one or more of RAM, ROM, SSD, or disk-based storage. The computer readable media 134 may be used to store instructions 136 that are executable by the processors 132 to perform the various functions of the CMS 104. The computer readable media 134 may include N campaigns 138 (where N>0). For example, a first campaign 140 may include a first set of triggers 144 and an Nth campaign 142 may include an Nth set of triggers 146. The first campaign may include a first set of actions 148 and the Nth campaign 142 may include an Nth set of actions 150. The triggers 144 to 146 may specify conditions, such as events, whose occurrence causes (e.g., triggers) the agent 116 to perform the corresponding set of actions 148 to 150. For example, after downloading the Nth campaign 142, in response to detecting an occurrence of the Nth triggers 146, the agent 116 may perform the Nth set of actions 150. In some cases, each trigger may have a corresponding action or set of actions. For example, a first trigger may cause the agent 116 to perform a first set of actions, a second trigger may cause the agent 116 to perform a second set of actions, and so on.

In some cases, one or more the campaigns 140 to 142 may have an associated expiry date or a predetermined period of time during which the campaign is active. For example, the predetermined period of time may begin when the campaign is installed on a computing device and terminate after the predetermined period of time has elapsed.

The triggers 144 to 146 may include various events that may occur in the computing device, such as, for example, a set of digits associated with a destination of a call or an SMS message, a universal resource locator (URL) or other form of network address, a battery level of a computing device, a signal strength level of a network, a roaming state, and the like. Thus, any event capable of occurring on the computing device may be used as a trigger for a campaign.

The computing device 102 may periodically (e.g., at pre-determined intervals, such as every day) connect to the CMS 104 to obtain software, campaign updates (e.g., add, delete, or modify campaigns), and/or firmware updates. After the computing device 102 connects to the CMS 104, the computing device 102 may determine that a new campaign, such as one of the campaigns 138, is to be downloaded or the CMS 104 may instruct the computing device 102 to download one or more of the campaigns 138. The campaign may be downloaded in a way that a subscriber associated with the computing device 102 does not incur any charges (e.g., no charges are incurred for the connection time, amount of data downloaded, etc.). For example, the computing device 102 may download and store the Nth campaign 142 in the downloaded campaigns 118. Each of the N campaigns 140 to 142 may include a unique campaign identifier. The unique campaign identifier may enable a computing device to determine whether a particular campaign has already been downloaded to avoid a computing device repeatedly downloading the same campaign each time the computing device connects to the CMS 104. The unique campaign identifier may enable a computing device to determine whether to download a modified version of a campaign that was previously downloaded. For example, the computing device may download and install a campaign. At a later point in time, the campaign may be modified and placed on the CMS 104. The computing device may connect to the CMS 104, determine that a modified campaign is available, download the modified campaign from the CMS 104, and replace the previously downloaded campaign with the modified campaign.

The agent 116 may monitor the computing device 102 to determine whether the Nth set of conditions 146 occur. In response to detecting that at least one condition of the Nth set of conditions has occurred, the agent 116 may perform one or more of the corresponding Nth set of actions 150. For example, when the Nth set of conditions 146 include numeric digits, after a communication (e.g., a voice call or an SMS message) has occurred, the agent 116 may determine whether a destination of the communication has an associated set of digits that matches the digits in the Nth set of conditions 146. If the agent 116 determines that the destination of the communication has an associated set of digits that matches the digits in the Nth set of conditions 146, then the agent 116 may perform the corresponding actions 150. To illustrate, a subscriber may call or send an SMS message to a business entity. The agent 116 may determine that the digits of the destination of the call or the SMS message match the Nth conditions 146 of the campaign 142, e.g., the digits entered by the subscriber match a phone number associated with the business entity. In response, the agent 116 may perform one or more actions, such as displaying the message 122 indicating that the business entity has an app available. In response to the subscriber selecting the Mth UI element 130, the computing device 102 may download and install the app. For example, when the business entity is a financial institution, the app may enable the subscriber to perform various actions related to an account associated with the subscriber at the financial institution, such as check an account balance, transfer funds from one account to another account etc. As another example, when the business entity is an online merchant, the app may enable the subscriber to purchase items from the online merchant, track previously placed orders, etc. As yet another example, the agent 116 may determine that a communication (e.g., a call or SMS message) was placed to a first merchant and display the message 122 promoting a second merchant, such as a competitor to the first merchant. To illustrate, in response to the agent 116 determining that a communication was placed to a first pizza chain, agent 116 may display the message 122 including a promotion (e.g., a coupon or other type of promotional discount) from a second (e.g., rival) pizza chain.

In some cases, after one or more computing devices, such as the computing device 102, have downloaded and stored the Nth campaign 142, the CMS 104 may send a trigger 152 (e.g., one of the triggers 144 to 146) to trigger the Nth campaign. For example, the trigger 152 may be sent using an SMS message. The trigger 152 may include a campaign identifier (ID) 154 (e.g., a campaign number or campaign name) and a secure data element 156 (e.g., a cryptographic hash code, such as MD5). The CMS 104 may generate the secure data element 156 and associated the secure data element 156 with the Nth campaign 156 when the Nth campaign 142 is stored on the CMS 104 by a user, such as an administrator. The secure data element 156 may be generated using a key that is known to both the CMS server 104 and one or more of the computing devices that download the Nth campaign.

In response to receiving the trigger 152, the agent 116 may determine whether the Nth campaign 142 was downloaded (e.g., stored as one of the downloaded campaigns 118) using the campaign ID 154 included in the trigger 152. If the agent 116 determines that the Nth campaign 142 was downloaded, the agent 116 may authenticate the trigger 152 by determining whether the trigger 152 originated from the CMS 104. For example, the agent 116 may generate a local secure data element using the downloaded Nth campaign 142 based on a local key and compare the locally generated secure data element with the secure data element 156 included in the trigger 152. If the locally generated secure data element matches the secure data element 156, the agent 116 may determine that the trigger 152 is authentic, e.g., the trigger 152 was sent by the CMS 104, because the key used to generated the secure data element 156 is known to the CMS 104 and the computing device 102. After determining that the trigger 152 originated from the CMS 104, the agent 116 may perform the Nth set of actions 150 of the Nth campaign 142. If the locally generated secure data element does not match the secure data element 156, the agent 116 may send a message to the CMS 104 indicating that the trigger 152 could not be authenticated.

Thus, multiple computing devices, such as the computing device 102, may periodically connect to a server, such as the CMS 104. At least some of the multiple computing devices may determine whether to download one or more campaigns that are hosted by the server. For example, a computing device may download a campaign in response to an instruction from the server. As another example, a computing device may download a campaign in response to determining that a download criteria associated with the campaign matches one or more characteristics associated with the computing device, such as an area code associated with the computing device, a zip code of a user (e.g., a subscriber) associated with the computing device, a current geographic location of the computing device, a usage pattern associated with the computing device, an operating system associated with the computing device, a software application installed on the computing device, etc.

The campaign may include a set of triggers whose occurrence may cause a software agent (e.g., the agent 116) to perform one or more actions associated with the campaign. For example, the agent may perform the actions associated with a campaign in response to determining that a user has performed (or completed performing) a particular action, such as calling or texting a particular phone number (e.g., a set of digits). The actions performed by the agent may include displaying a message (e.g., the message 122) on a display device associated with the computing device. As another example, the agent may perform the actions associated with a campaign in response to (1) receiving a trigger (e.g., the trigger 152) from the server, (2) determining that the campaign was previously downloaded to the computing device, and (3) determining that the trigger was sent by the server.

Figure 2:
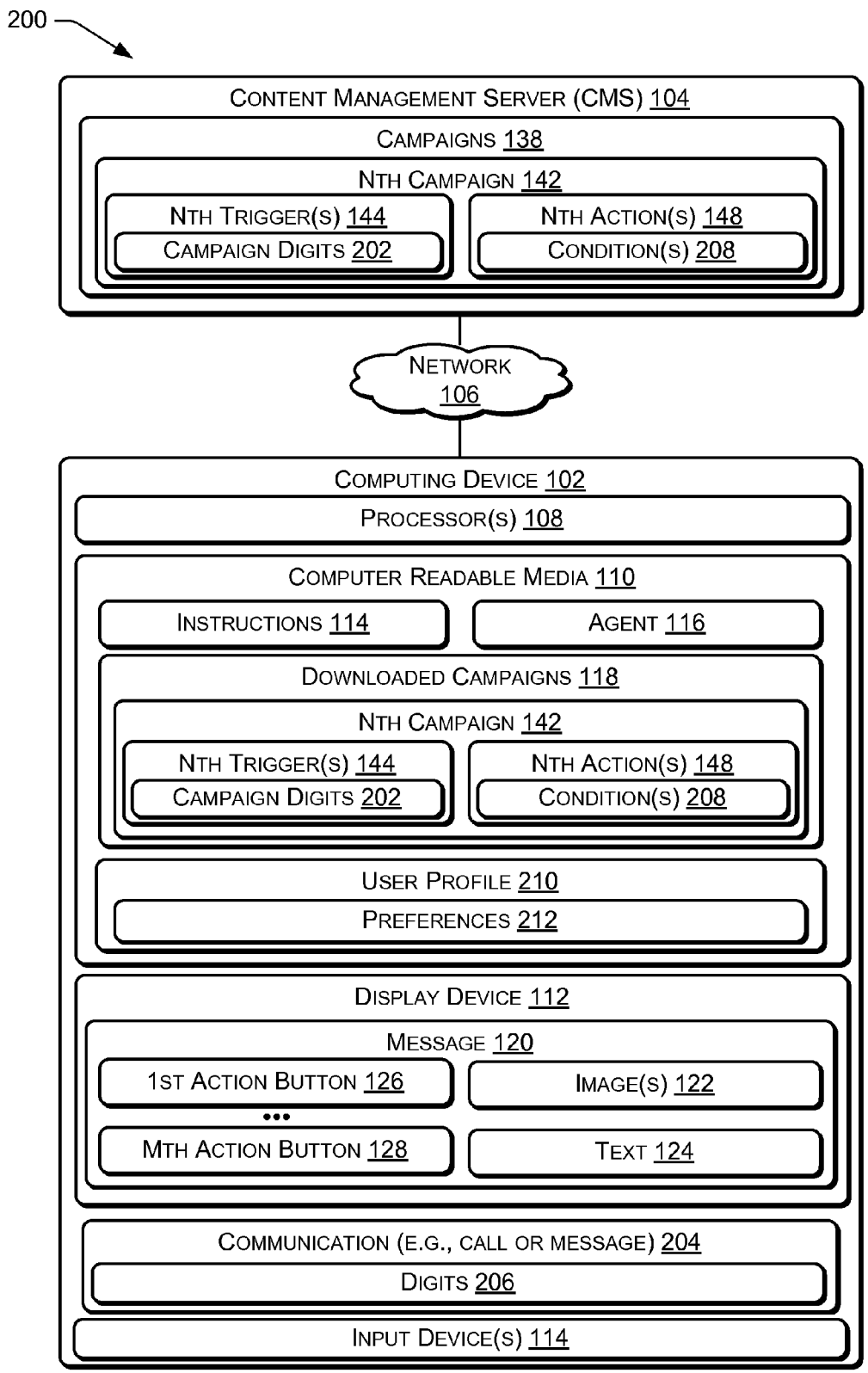
FIG. 2 is a block diagram illustrating a system for triggering actions after comparing input digits to campaign digits according to some implementations.

FIG. 2 is a block diagram illustrating a system 200 for triggering actions after comparing input digits to campaign digits according to some implementations. The computing device 102 may connect to the CMS 104 and determine whether to download one or more of the campaigns 138. As illustrated in FIG. 2, the computing device 102 may download the Nth campaign 152 from the CMS 104 and store the Nth campaign 152 in the downloaded campaigns 118.

After the Nth campaign 152 has been stored, the agent 116 may monitor the computing device 102. In response to detecting that one or more of the Nth set of triggers 144 has occurred, the agent 116 may perform one or more actions from the Nth set of actions 148 based on which trigger from the Nth set of triggers 144 occurred. For example, the Nth set of triggers may include a set of campaign digits 202. Each set of digits of the campaign digits 202 may include one or more digits, e.g., "IIII," "III IIII," "III III IIII" (where I is an integer from 0 to 9), such as "611," "800 555 1212," etc.

Each time the agent 116 determines that a communication 204 has been completed (e.g., a call has been completed or an SMS message has been sent), the agent 116 may compare digits 206 associated with the communication 204 with the campaign digits 202. If the digits 206 associated with the communication 204 match the campaign digits 202, the agent 116 may perform one or more of the Nth actions 148.

The Nth set of actions 148 may include one or more conditions 208 associated with one or more actions of the Nth set of actions 148. For example, the conditions 208 may specify when an action is to be performed by the agent 116. To illustrate, the conditions 208 may specify to perform an action (i) after the communication 204 has completed, (ii) a predetermined amount of time after the communication 204 has completed, (iii) when the computing device 102 is in a particular state (e.g., idle state, wake state, restart), etc. The computing device 102 may transition from a wake state to an idle state after a predetermined period of inactivity. When the computing device 102 detects activity, such as detecting that the computing device 102 has been moved (e.g., picked up) or detecting input from one of the input devices 114, the computing device 102 may transition from the idle state to the wake state.

The computer readable media 110 may include a user profile 210 associated with a user of the computing device 102. The user profile 210 may include one or more preferences 212 associated with the user. For example, the preferences 212 may include information specifying when the agent 116 is to perform actions from a campaign. To illustrate, the preferences 212 may specify that the agent 116 perform an action from a campaign (i) after the communication 204 has completed, (ii) a predetermined amount of time after the communication 204 has completed, (iii) when the computing device 102 is in a particular state (e.g., idle state, wake state, restart), etc.

The agent 116 may perform one or more of the Nth set of actions 148 based on the conditions 208, the preferences 212, or both. If there is a conflict between the conditions 208 and the preferences 212 (e.g., the conditions 208 specify to perform an action after the communication 204 has completed while the preferences 212 specify to perform the action when the computing device 102 is in a particular state, the preferences 212 may take precedence over the conditions 208.

The agent 116 may perform one or more actions from the Nth set of actions 148, such as automatically displaying a message, such as the message 120, opening a browser to a particular location (e.g., a URL specified in the campaign), connecting a voice call to a phone number specified by the campaign, sending a text message to a phone number specified by the campaign, opening an application and performing one or more actions using the application, or the like.

Thus, a campaign may specify one or more triggers and one or more actions to perform when a particular trigger occurs. When an agent determines that one of the triggers associated with a campaign has occurred, the agent may perform one or more actions that correspond to the trigger that occurred. While a set of digits associated with a communication is used as an example of a trigger, other types of triggers may be used to cause the agent to perform actions associated with a campaign. Other examples of triggers may include determining when a user has (i) navigated to a particular network address (e.g., webpage or URL), (ii) sent an email message to a particular domain, (iii) received an email from a particular domain, or (iv) spoken or typed a particular word or a particular phrase.

The campaign may specify conditions describing when to perform the actions, such as whether to perform the action immediately after a communication has completed, a predetermined amount of time after the communication has completed, when the computing device is in a particular state, etc. A user of the computing device may specify preferences identifying when to perform the actions. The agent may perform the actions associated with a trigger in a campaign based on the conditions specified by the campaign and/or based on the user preferences. The campaigns may enable a service provider to provide targeted information, targeted assistance, targeted advertising and other types of targeted services to users.

Figure 3:
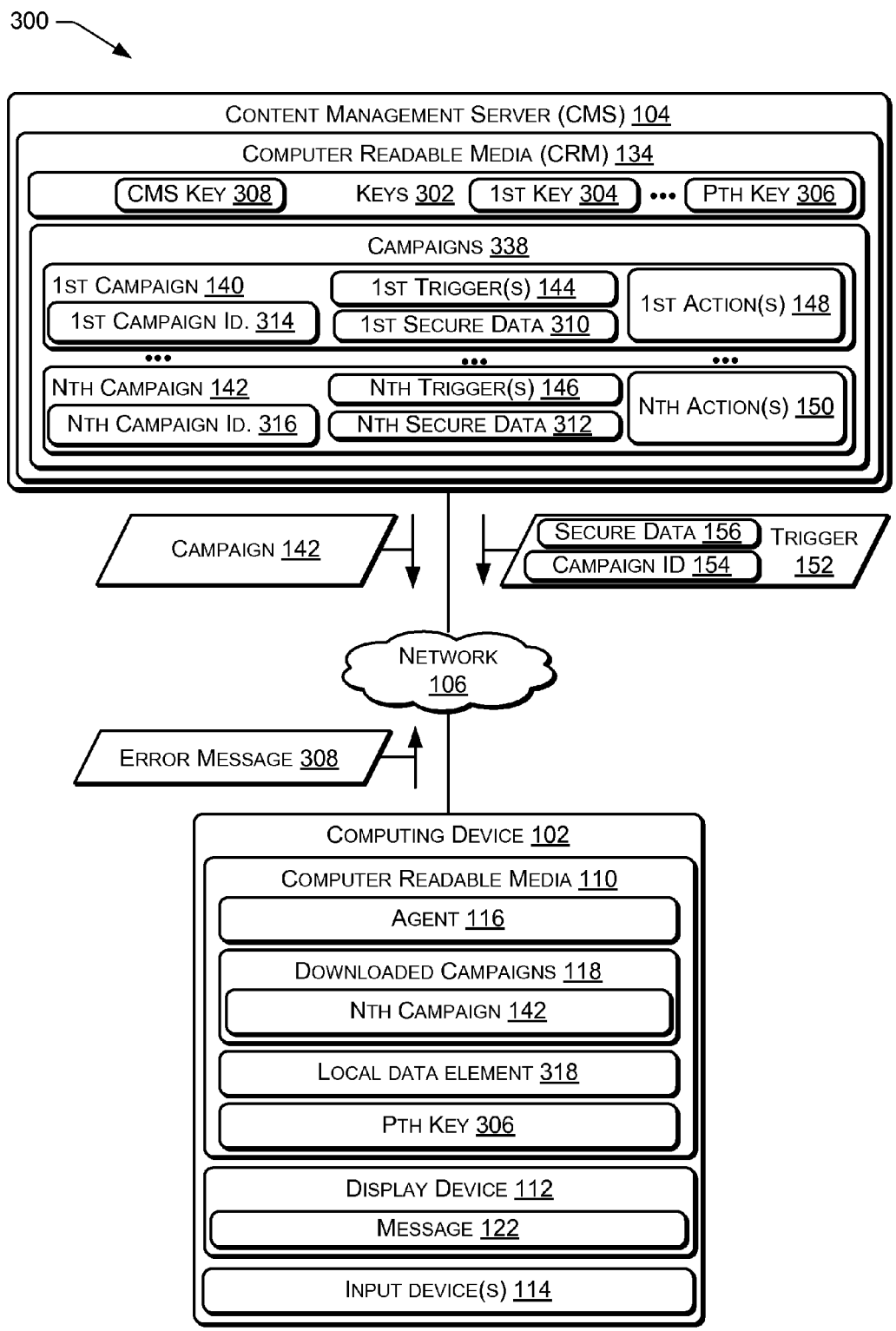
FIG. 3 is a block diagram illustrating a system for triggering actions after comparing a locally generated data element with a data element associated with a campaign according to some implementations.

FIG. 3 is a block diagram illustrating a system 300 for triggering actions after comparing a locally generated data element with a data element associated with a campaign according to some implementations. Some campaigns that are downloaded by multiple computing devices, such as the computing device 102, may be triggered when the CMS 104 sends the trigger 154 to one or more of the computing devices. Thus, the CMS 104 may selectively trigger at least some campaigns. For example, the CMS 104 may send the trigger 154 to computing devices in a particular geographic location or that are running a particular operating system, triggering the campaign for some, but not all of the computing devices.

One or more keys 302 may be stored in the computer readable media 134 of the CMS 104. For example, P keys (where P>0), such as a first key 304 to a Pth key 306 may be stored in the CMS 104. Each of the P keys 304 to 306 may be associated with a computing device that is capable of connecting to the CMS 104. For example, the first key 304 may be associated with a first computing device, a second key may be associated with a second computing device, and the Pth key 306 may be associated with a Pth computing device. The P keys 304 to 306 may be provided to each computing device when each computing device is initially provisioned. For example, the Pth key 306 may be provided to the computing device 102. The Pth key 306 may be stored in a portion of the computer readable media 110 that is inaccessible to a user to prevent the Pth key 306 from being inadvertently modified or deleted. The keys 302 may include a CMS key 308 that is associated with the CMS 104. In some implementations, at least some of the P keys 304 to 306 and the CMS key 308 may be identical while in other implementations at least some of the P keys 304 to 306 and the CMS key 308 may be different from each other.

A cryptographic hash function may use the keys 302 to generate hash codes. For example, at least some of the campaigns 338 may be triggered by the CMS 104 sending a trigger (e.g., the trigger 152) to one or more computing devices. For campaigns that are triggered by the CMS 104 sending a trigger, the CMS 104 compute a corresponding hash code based on one or more of the keys 302. For example, a cryptographic hash function may use one or more or the keys 302 to generate a secure data element (e.g., a hash code or a message digest) for at least some of the campaigns 338, such as a first secure data element 310 for the first campaign 140 and an Nth secure data element 312 for the Nth campaign 142. At least some of the campaign 338 may have an associated campaign identifier (Id.), such as a first campaign identifier 314 associated with the first campaign 140 and an Nth campaign identifier 316 associated with the Nth campaign.

Each computing device may periodically or in response to detecting a particular event occurring, connect to the CMS 104. After connecting to the CMS 104, in some cases, each computing device may determine whether one or more of the campaigns 338 are to be downloaded, while in other cases, the CMS 104 may instruct at least some of the computing devices to each download one or more of the campaigns 338. For example, after connecting to the CMS 104 the computing device 102 may be instructed or determine to download the Nth campaign 142 from the CMS 104. The computing device 102 may download the Nth campaign 142 and store the Nth campaign 142 in the downloaded campaigns 118.

After the Nth campaign 142 has been downloaded and stored on the computing device 102, the agent 116 may monitor the computing device 102 for the occurrence of triggers associated with the downloaded campaigns 118. In response to detecting the occurrence of one of the triggers associated with the downloaded campaigns 118, the agent 116 may perform the actions corresponding to the trigger that occurred. For example, the CMS 104 may send the trigger 152 to one or more computing devices, including the computing device 102. The agent 116 may detect that the computing device 102 has received the trigger 152 from the CMS 104.

In response to detecting the trigger 152, the agent 116 may determine whether the campaign to be triggered by the trigger 152 was downloaded to the computing device 102 by determining whether the campaign identifier 154 included in the trigger 152 matches a campaign identifier of one of the downloaded campaigns 118. For example, the agent 116 may compare the campaign identifier 154 to the campaign identifier 316 of the Nth campaign 142 stored in the downloaded campaigns 118. If the campaign identifier 154 is not a match for a campaign identifier of one of the downloaded campaigns 118, the agent 116 may ignore the trigger 152.

If the campaign identifier 154 included in the trigger 152 matches a campaign identifier of one of the downloaded campaigns 118, the agent 116 may authenticate the trigger 152 to determine whether the trigger 152 originated from an authorized sender, such as the CMS 104. To authenticate the trigger 152, the agent 116 may generate a local data element 318 and compare the local data element 318 with the secure data element 156 provided in the trigger 152. For example, the agent 116 may use a cryptographic hash function using the Pth key 306 associated with the computing device 102 to generate the local data element based on the Nth campaign 142. To illustrate, the agent 116 may concatenate at least a portion (e.g., the Nth set of actions 150) of the contents of the Nth campaign 142 and use a cryptographic hash function on the concatenated portion of the contents based on the Pth key 306 to generate the local data element 318. For example, the Pth key 306 and the CMS key 308 may be shared secret keys.

The agent 116 may compare the local data element 318 (e.g., generated by the computing device 102 based on the downloaded Nth campaign 142 using the Pth key 306) with the secure data element 156 (e.g., generated by the CMS 104 based on the Nth campaign 142 using the CMS key 308). If the local data element 318 does not match the secure data element 156, the agent 116 may determine that the trigger 152 did not originate from an authorized device and ignore the trigger 152. In some cases, the agent 116 may send a message to the CMS 104 indicating that the agent 116 was unable to authenticate the trigger 152. If the local data element 318 matches the secure data element 156, the agent 116 may determine that the trigger 152 originated from an authorized device, such as the CMS 104, and perform one or more of the Nth set of actions 150 of the Nth campaign 142.

Thus, an originating device (e.g., the CMS 104) and a receiving device (e.g., the computing device 102) may each have a key. The originating device and the receiving device of the trigger 152 may independently generate a secure data element, such as a cryptographic hash code or message digest, based on their respective keys. The originating device may send a trigger that includes the secure data element to trigger a campaign. The receiving device may generate a local data element based on a previously downloaded campaign and the key associated with the receiving device and compare the local data element with the secure data element. If the local data element matches the secure data element, the receiving device may trigger the campaign by performing one or more actions associated with the campaign. In this way, the originating device can send a trigger using a secure SMS message that is capable of being authenticated by the recipient device, preventing unauthorized devices from triggering campaigns using spoofed SMS messages.

Though SMS messages may be insecure, have a 160 character size limitation, and have no authentication method that is widely available on devices, the systems and techniques described herein enable the server to send secure SMS messages to multiple computing devices. The computing devices may independently validate the authenticity of the sender, the authenticity of the content and may use the authenticated secure SMS message as a trigger message to generate an on device experience that can be preconfigured and that is not restricted to the 160 character SMS limit.

The ability for computing devices to authenticate an SMS message, validate the content and create a specific experience on the device, allows for the remote triggering of interactions using a common messaging framework available to virtually all wireless phones. This allows authorized parties to securely instruct computing devices to take an action without worrying about trigger messages being spoofed.

Figure 4:
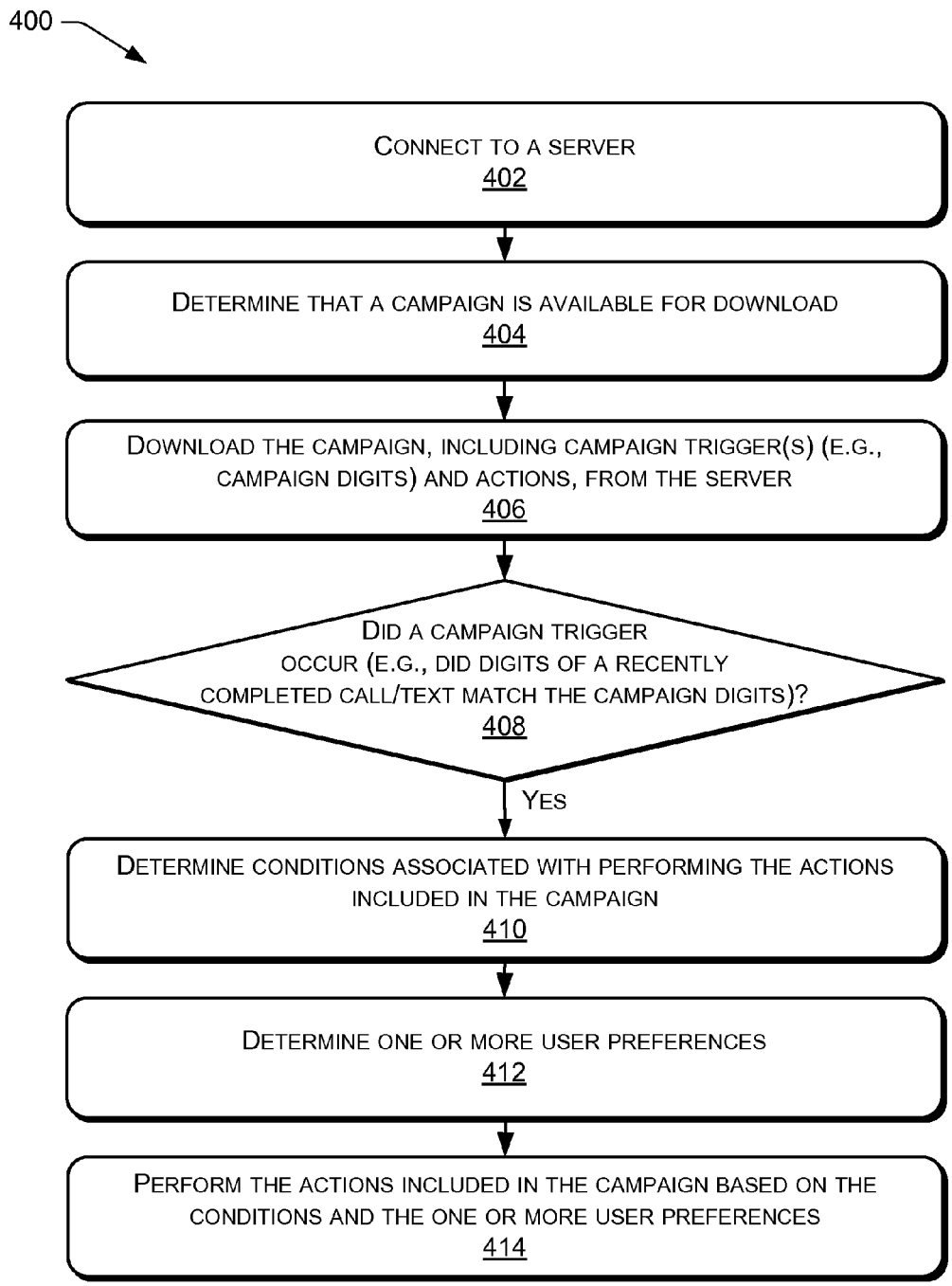
FIG. 4 is a flow diagram of an example process that includes downloading a campaign that includes triggers and actions according to some implementations.
Figure 5:
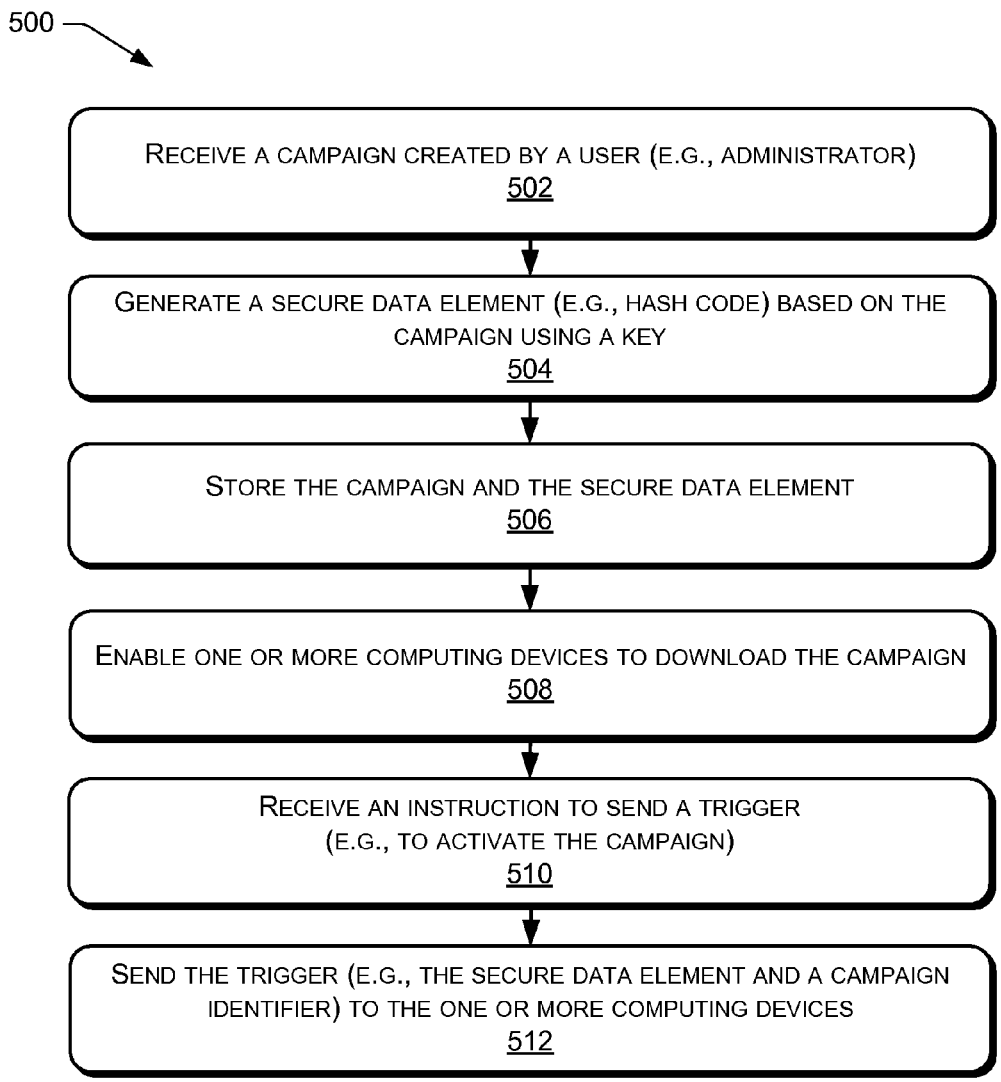
FIG. 5 is a flow diagram of an example process that includes sending a trigger to one or more computing devices according to some implementations.
Figure 6:
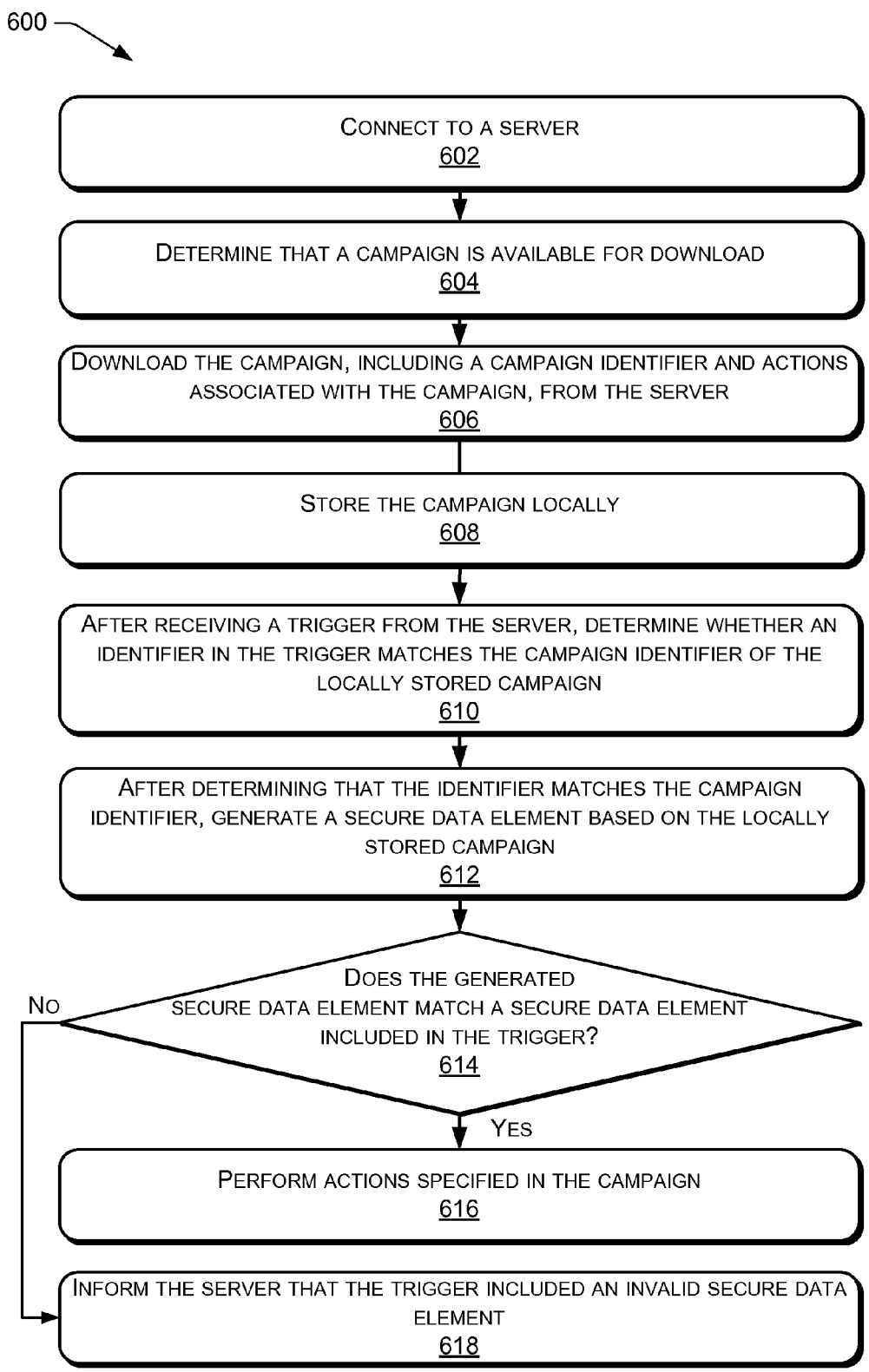
FIG. 6 is a flow diagram of an example process that includes receiving a trigger according to some implementations.

In the flow diagrams of FIGS. 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, and 600 are described with reference to the systems 100, 200, and 300, respectively, as described above, although other models, frameworks, systems and environments may implement these processes.

FIG. 4 is a flow diagram of an example process 400 that includes downloading a campaign that includes triggers and actions according to some implementations. The process 400 may be performed by the computing device 102 of FIGS. 1 to 3.

At 402, the computing device may connect to a server. At 404, the computing device may determine that a campaign is available for download. At 406, the computing device may download the campaign, including campaign triggers and actions, from the server. For example, in FIG. 2, the computing device 102 may connect to the CMS 104 and determine that one or more of the campaigns 138 are to be downloaded and download one or more of the campaigns 138 from the CMS 104, such as the Nth campaign 142. The nth campaign 142 may include one or more triggers and each trigger may have an associated one or more set of actions, such as the Nth set of triggers 144 and the Nth set of actions 148.

At 408, the computing device may determine whether a campaign trigger occurred. For example, in FIG. 2, the agent 116 may determine whether one or more of the Nth triggers 144 occurred. To illustrate, the agent 116 may determine whether the digits 206 associated with a recently completed communication 204 match the campaign digits 202 of the nth campaign 152.

In response to determining that the campaign trigger occurred, at 408, the computing device may determine conditions associated with performing the actions included in the campaign, at 410. At 412, one or more user preferences may be determined. At 414, the actions included in the campaign may be performed based on the conditions and the one or more user preferences. For example, in FIG. 2, in response to determining that the campaign digits 202 match the digits 206 associated with the recently completed communication 204, the agent 116 may determine the conditions 208, determine the preferences 212, and perform the Nth set of actions 148 based on the conditions 208 and the preferences 212. In response to determining that the campaign trigger did not occur, at 408, the computing device may take no further action.

Thus, after downloading a campaign, a computing device may monitor for the occurrence of one or more triggers associated with the campaign. When the computing device determines that one of the triggers associated with the campaign occurred, the computing device may perform one or more actions corresponding to the trigger that occurred. For example, one type of trigger may specify that when a set of digits associated with a completed communication (e.g., a call or an SMS message) matches a set of digits associated with the campaign, the computing device is to perform one or more actions associated with the campaign. The one or more actions may include automatically opening a web browser to a particular location, automatically downloading a software application, automatically downloading and installing a software application, displaying a message etc. The displayed message may include one or more user interface elements that when selected cause a web browser to be launched to a particular location, cause a software application to be downloaded, cause a software application to be downloaded and installed, etc.

Thus, a campaign may enable a service provider to target specific users (e.g., subscribers) based on the digits associated with a particular communication that the user completed. For example, the campaign may enable the service provider to provide information to users about software applications that can be used on their computing device (e.g., instead of dialing a number) to accomplish various tasks, such as checking account balances and a financial institution, purchasing items from an online merchant, etc.

FIG. 5 is a flow diagram of an example process 500 that includes sending a trigger to one or more computing devices according to some implementations. The process 500 may be performed by a server, such as the CMS 104 of FIG. 1, 2, or 3.

At 502, a campaign created by a user may be received. For example, in FIG. 3, the CMS 104 may receive one of the campaigns 338 created by a user, such as an administrator of the CMS 104.

At 504, a secure data element may be generated based on the campaign using a key. For example, in FIG. 3, the CMS 104 may create the Nth secure data element 312 based on the Nth campaign 142 using the CMS key 308. A cryptographic hash function may be used to create the Nth secure data element 312 (e.g., a cryptographic hash code or message digest) using the CMS key 308.

At 506, the campaign and the secure data element may be stored. For example, in FIG. 3, the CMS 104 may associate the campaign with the secure data element and store the campaign and the secure data element in a memory (e.g., the computer-readable media 134) of the CMS 104.

At 508, one or more computing devices may be enabled to download the campaign. For example, in FIG. 3, computing devices that are authorized to access a network of a network service provider may periodically connect to the CMS 104 and download one or more of the campaigns 338.

At 510, an instruction to send a trigger may be received. For example, in FIG. 3, a user, such as an administrator, may provide various criteria and the CMS 104 may send the trigger 152 to one or more computing devices, such as the computing device 102, based on the various criteria. For example, the criteria may include a geographic location of the computing device, an area code associated with the computing device, a zip code of an account associated with the computing device, an operating system of the computing device, or other type of criteria.

At 512, the trigger may be sent to the one or more computing devices. For example, in FIG. 3, the CMS 104 may send the trigger 152 (e.g., using an SMS message) to one or more computing devices, such as the computing device 102. The trigger 142 may include the secure data element generated by the CMS 104 and a campaign identifier.

Thus, a user may create a campaign for storage on a server. The server may generate a secure data element using the campaign based on a key that is known to the server. For example, the secure data element may be a cryptographic hash code or message digest. The server may associate the secure data element with the campaign and store the campaign and the secure data element in a memory of the server. When certain user provided criteria are met, the server may send a trigger that includes a campaign identifier and the secure data element to one or more computing devices. The secure data element may enable the one or more computing devices to authenticate the trigger by determining whether the trigger was originated from the server. For example, each of the one or more computing devices may have their own key and may create a local data element based on the campaign. The one or more computing devices may compare the local data element with the secure data element received in the trigger to determine whether the trigger originated from the server. In this way, a service provider may trigger a campaign on multiple computing devices. For example, the campaigns may be used to notify subscribers when a software or firmware upgrade is to be performed, when a network outage may be expected due to inclement weather or a network upgrade, provide information to users in various geographic areas or devices running particular operating systems, etc.

FIG. 6 is a flow diagram of an example process 600 that includes receiving a trigger according to some implementations. The process 600 may be performed by a computing device, such as the computing device 102 of FIG. 1, 2 or 3.

At 602, the computing device may connect to a server. At 604, the computing device may determine that a campaign is available for download. At 606, the computing device may download the campaign, including a campaign identifier and actions associated with the campaign, from the server. For example, in FIG. 3, the computing device 102 may connect to the CMS 104 and determine that one or more of the campaigns 138 are to be downloaded and download one or more of the campaigns 138 from the CMS 104, such as the Nth campaign 142. The Nth campaign 142 may include the campaign identifier 316 and the Nth set of actions 150.

At 608, the campaign may be stored locally. For example, in FIG. 3, the computing device 102 may download the Nth campaign 142 and store the Nth campaign locally, e.g., in the computer readable media 110.

At 610, after receiving a trigger from the server, the computing device may determine whether an identifier in the trigger matches the campaign identifier of the locally stored campaign. For example, in response to receiving the trigger 152 from the CMS 104, the computing device 102 may determine whether the campaign identifier 154 matches the campaign identifier 316 of the Nth campaign 142.

At 612, after determining that the identifier matches the campaign identifier, the computing device may generate a secure data element based on the locally stored campaign. For example, in FIG. 3, in response to determining that the campaign identifier 154 matches the campaign identifier 316 of the Nth campaign 142, the computing device 102 may generate the local data element 318 based on the Nth campaign 142 stored locally in the downloaded campaigns 118 using the Pth key 306.

At 614, a determination may be made whether the generated secure data element matches a secure data element included in the trigger. For example, in FIG. 3, the computing device 102 may determine whether the local data element 318 matches the secure data element 156 included in the trigger 152.

If a determination is made that the generated secure data element matches the secure data element included in the trigger, at 614, the computing device may perform actions specified in the campaign, at 616. For example, in response to determining that the secure data element 156 included in the trigger 152 matches the local data element 318 (e.g., generated using the Nth campaign 142 stored in the downloaded campaigns 118 using the Pth key 306), the computing device 102 may perform one or more of the Nth actions 150 associated with the Nth campaign 142 (e.g., based on conditions associated with the campaign and based on user preferences).

If a determination is made that the generated secure data element does not match the secure data element included in the trigger, at 614, the computing device may inform the server that the trigger that was received included an invalid secure data element. For example, in FIG. 3, in response to determining that the secure data element 156 does not match the local data element 318, the computing device 102 may send the error message 308 to the CMS 104 indicating that it received a trigger that included an invalid secure data element.

Thus, one or more computing device may periodically connect to a server. Each of the one or more computing devices may determine whether to download one or more campaigns stored on the server. At least some of the computing devices may download one or more campaigns and store the downloaded campaigns in a memory of the computing device. To trigger a campaign, the server may send a trigger, including a campaign identifier and a secure data element, to at least a portion of the computing devices that downloaded the campaign. The secure data element may be a cryptographic hash code or message digest generated by the server using at least a portion of the contents of the campaign and a key that is known to the server.

In response to receiving the trigger, a computing device may determine whether the campaign identifier in the trigger matches a campaign identifier of a previously downloaded campaign. If the campaign identifier in the trigger matches a campaign identifier of a previously downloaded campaign, the computing device may generate a local data element based on the previously downloaded campaign using a key known to the computing device. The computing device may compare the local data element to the secure data element included in the trigger. If the local data element matches the secure data element included in the trigger, the computing device may perform the actions associated with the downloaded campaign. If the local data element does not match the secure data element included in the trigger, the computing device may send a message to the server indicating that the computing device was unable to authenticate a trigger.

In this way, a server can distribute and securely trigger campaigns. The campaigns may be securely triggered because the trigger message sent to the computing devices includes the secure data element generated by the server. The computing devices can authenticate triggers to determine whether the triggers were sent by the server, preventing the spoofing of trigger messages.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device, comprising:
   one or more hardware processor devices; and
   one or more computer readable media storing instructions that are executable by the one or more processor devices to perform acts comprising:
   downloading a campaign from a server, the campaign including an identifier, one or more trigger conditions and at least one action associated with each of the one or more trigger conditions;
   detecting that an event satisfying a first trigger condition of the one or more trigger conditions has occurred, the event comprising receipt of a trigger message from the server, wherein the trigger message includes the identifier of the downloaded campaign; and
   in response to detecting that the event satisfying the first trigger condition has occurred,
   generating a local cryptographic hash code based on the campaign using a key associated with the computing device;
   comparing the local cryptographic hash code with a cryptographic hash code included in the trigger message; and
   in response to determining that the local cryptographic hash code matches the cryptographic hash code included in the trigger message based on the comparing, performing the at least one action associated with the first trigger condition.

2. The computing device of claim 1, wherein the at least one action comprises displaying a message that includes a graphical image, text, and one or more user interface elements.

3. The computing device of claim 2, wherein the one or more user interface elements are selectable by a user to perform at least one of downloading a software application, installing the software application, opening the software application, simulating user input to the software application, closing the software application, or opening a web browser to a particular address.

4. One or more non-transitory computer readable media storing instructions that are executable by one or more processors to perform acts comprising:
   downloading a campaign from a server by a computing device, the campaign including a condition and a set of actions to perform after the condition occurs, wherein the condition comprises a set of numeric digits representing a phone number;
   determining that the condition included in the campaign occurred, said determining including determining that a communication from the computing device to the phone number occurred, the communication including one of a voice call or a short message service message;
   in response to determining that the condition included in the campaign occurred, determining a time to perform the set of actions, wherein the time to perform the set of actions comprises a state of the computing device; and
   performing the set of actions at the determined time,
   wherein the state of the computing device comprises one of an awake after idle state corresponding to detection by the one or more processors of motion of a computing device including the one or more processors or to detection by the one or more processors of user input, a state of a signal strength, a state of a battery level, or a roaming state.

5. The one or more non-transitory computer readable media of claim 4, wherein the time to perform the set of actions is further based on one of a current time, the current time plus a predetermined period of time, or the current time plus a user specified period of time.

6. The one or more non-transitory computer readable media of claim 4, wherein determining the time to perform the set of actions comprises:
   identifying user preferences associated with a user of the computing device; and
   determining the time to perform the set of actions based on the user preferences.

7. A method, comprising:
under control of one or more processors of a computing device, the processors configured with instructions that are executable, performing acts comprising:
downloading, from a server, a campaign that includes a campaign identifier and one or more actions;
storing the downloaded campaign on the computing device;
receiving, at the computing device, a short message service (SMS) message that includes the campaign identifier and a cryptographic hash code;
in response to receiving the SMS message including the campaign identifier, generating a local cryptographic hash code;
in response to determining that the local cryptographic hash code matches the cryptographic hash code included in the SMS message, determining one or more conditions associated with when to perform the one or more actions included in the campaign, wherein the one or more conditions include at least one of:
completion of a communication from the computing device to a destination network address that matches a campaign network address included in the campaign, or
receipt of a trigger message from the server, wherein the trigger message includes the campaign identifier of the downloaded campaign;
determining that at least one of the one or more conditions has occurred; and
in response to determining that the at least one of the one or more conditions have occurred, performing, at the computing device, at least one of the one or more actions included in the campaign corresponding to the at least one of the one or more conditions.

8. The method of claim 7, wherein the SMS message originates from the server.

9. The method of claim 7, wherein:
the cryptographic hash code included in the campaign is generated by the server based on the campaign using a shared secret key that is accessible to the server.
the local cryptographic hash code is generated by the computing device based on the stored campaign using a copy of the shared secret key that is accessible to the computing device.

10. The method of claim 7, the acts further comprising:
in response to determining that the local cryptographic hash code does not match the cryptographic hash code included in the SMS message, sending an error message to the server indicating that the SMS message could not be authenticated.

11. The method of claim 7, wherein:
determining the conditions associated with when to perform the one or more actions included in the campaign comprises retrieving the conditions from the SMS message.

12. The method of claim 7, wherein:
determining the conditions associated with when to perform the one or more actions included in the campaign comprises determining one or more user preferences.

13. The method of claim 7, wherein:
the campaign expires a predetermined time period after the campaign is downloaded or after a predetermined date.

* * * * *